United States Patent
Hoadley et al.

(10) Patent No.: US 10,877,722 B2
(45) Date of Patent: *Dec. 29, 2020

(54) ACTIVITY RESET

(71) Applicant: Sonos, Inc., Santa Barbara, CA (US)

(72) Inventors: Joni R. Hoadley, Santa Barbara, CA (US); Diane Roberts, Santa Barbara, CA (US); Robert A. Lambourne, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,020

(22) Filed: Aug. 30, 2019

(65) Prior Publication Data
US 2019/0384566 A1    Dec. 19, 2019

Related U.S. Application Data

(63) Continuation of application No. 16/055,568, filed on Aug. 6, 2018, now Pat. No. 10,402,156, which is a
(Continued)

(51) Int. Cl.
*G06F 3/16* (2006.01)
*H04N 21/633* (2011.01)
(Continued)

(52) U.S. Cl.
CPC ........... *G06F 3/165* (2013.01); *H04N 21/633* (2013.01); *G06F 3/04847* (2013.01); *G06F 17/00* (2013.01)

(58) Field of Classification Search
CPC .............. H04R 27/00; H04R 2227/005; H04R 2420/07; H04R 5/04; H04R 3/12;
(Continued)

(56) References Cited

U.S. PATENT DOCUMENTS

| 5,440,644 A | 8/1995 | Farinelli et al. |
| 5,761,320 A | 6/1998 | Farinelli et al. |

(Continued)

FOREIGN PATENT DOCUMENTS

| EP | 1389853 A1 | 2/2004 |
| WO | 200153994 | 7/2001 |

(Continued)

OTHER PUBLICATIONS

AudioTron Quick Start Guide, Version 1.0, Mar. 2001, 24 pages.
(Continued)

*Primary Examiner* — Duc Nguyen
*Assistant Examiner* — Alexander L Eljaiek
(74) *Attorney, Agent, or Firm* — McDonnell Boehnen Hulbert & Berghoff LLP

(57) ABSTRACT

In an example implementation, a method may involve sending a message that arranges a media playback system into a pre-defined state, wherein a first playback device is in a first zone having a first zone name, a second playback device is in a second zone having a second zone name, and a queue has a particular set of media items. The method may also involve detecting a trigger indicating a request to reset the media playback system. The method may further involve causing the media playback system to revert to the pre-defined state, wherein reverting may include assigning the first zone name to the first zone and joining the first playback device to the first zone, assigning the second zone name to the second zone and joining the second playback device to the second zone, and configuring the queue with the particular set of media items.

17 Claims, 6 Drawing Sheets

US 10,877,722 B2
Page 2

Related U.S. Application Data continuation of application No. 14/871,621, filed on Sep. 30, 2015, now Pat. No. 10,042,602.

(51) Int. Cl.
   *G06F 3/0484* (2013.01)
   *G06F 17/00* (2019.01)

(58) Field of Classification Search
   CPC ........ H04R 2430/01; H04L 2012/2849; H04L 29/06027; H04L 65/4084; H04L 12/2803; H04L 65/4076; H04L 67/306; H04L 12/2805; H04L 29/06; H04L 65/1069; H04L 12/2838; H04N 21/43615; H04N 21/8113; H04N 21/43637; H04N 21/4825; H04N 7/17318; G06F 17/30749; G06F 17/30772; G06F 3/0482; G06F 3/165; H04S 3/00; H04B 2203/545; H04W 84/18
   USPC ......... 700/94; 709/231, 218; 381/77, 81, 85, 381/107, 56, 58, 104, 119, 123, 300, 303, 381/80; 455/3.06, 519; 715/716; 379/101.01, 102.03; 713/1; 725/141, 45, 725/61
   See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter et al. |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang et al. |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,685,061 | B2 | 6/2017 | Shih et al. |
| 9,727,219 | B2 | 8/2017 | Kumar et al. |
| 9,916,126 | B2 | 3/2018 | Lang |
| 10,042,602 | B2 * | 8/2018 | Hoadley ................ G06F 3/165 |
| 10,402,156 | B2 * | 9/2019 | Hoadley ................ G06F 3/165 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2007/0142944 | A1 | 6/2007 | Goldberg et al. |
| 2010/0112945 | A1 | 5/2010 | Hanif et al. |
| 2011/0293113 | A1 | 12/2011 | McCarthy |
| 2013/0016848 | A1 * | 1/2013 | Warren ................ H04R 27/00 381/77 |
| 2013/0331970 | A1 | 12/2013 | Beckhardt et al. |
| 2013/0346859 | A1 * | 12/2013 | Bates ............... H04N 21/25816 715/716 |
| 2014/0201635 | A1 * | 7/2014 | Kumar ................ G06F 3/04847 715/716 |
| 2014/0324202 | A1 | 10/2014 | Coburn, IV et al. |
| 2015/0109112 | A1 | 4/2015 | Fadell et al. |
| 2015/0222987 | A1 | 8/2015 | Angel, Jr. et al. |

FOREIGN PATENT DOCUMENTS

| | | |
|---|---|---|
| WO | 2003093950 A2 | 11/2003 |
| WO | 2015066233 A2 | 5/2015 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action dated Jan. 31, 2019, issued in connection with European Application No. 167754456, 8 pages.
Final Office Action dated Dec. 27, 2017, issued in connection with U.S. Appl. No. 14/871,621, filed Sep. 30, 2015, 16 pages.
International Searching Authority, International Search Report and Written Opinion dated Dec. 20, 2016, issued in connection with International Application No. PCT/US2016/053985, filed on Sep. 27, 2016, 20 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Oct. 3, 2019, issued in connection with U.S. Appl. No. 16/557,020, filed Aug. 30, 2019, 26 pages.
Non-Final Office Action dated May 16, 2017, issued in connection with U.S. Appl. No. 14/871,621, filed Sep. 30, 2015, 17 pages.
Non-Final Office Action dated May 16, 2017, issued in connection with U.S. Appl. No. 14/997,269, filed Jan. 15, 2016, 18 pages.
Non-Final Office Action dated Jan. 22, 2019, issued in connection with U.S. Appl. No. 15/899,335, filed Feb. 19, 2018, 5 pages.
Non-Final Office Action dated Jan. 9, 2019, issued in connection with U.S. Appl. No. 16/055,568, filed Aug. 6, 2018, 15 pages.
Notice of Allowance dated Apr. 18, 2019, issued in connection with U.S. Appl. No. 16/055,568, filed Aug. 6, 2018, 8 pages.
Notice of Allowance dated May 31, 2019, issued in connection with U.S. Appl. No. 15/899,335, filed Feb. 19, 2018, 5 pages.
Notice of Allowance dated Apr. 5, 2018, issued in connection with U.S. Appl. No. 14/871,621, filed Sep. 30, 2015, 8 pages.
Notice of Allowance dated Oct. 5, 2017, issued in connection with U.S. Appl. No. 14/997,269, filed Jan. 15, 2016, 5 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.

(56) References Cited

OTHER PUBLICATIONS

UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
European Patent Office, European Office Action dated Jan. 23, 2020, issued in connection with European Application No. 16775445.6, 5 pages.
Yamaha DME Designer 3.0 Owner's Manual; Copyright 2008, 501 pages.

* cited by examiner

ACTIVITY RESET

CROSS REFERENCE TO RELATED APPLICATIONS

This application claims priority under 35 U.S.C. § 120 to, and is a continuation of, U.S. non-provisional application Ser. No. 16/055,568 filed on Aug. 6, 2018, entitled "Activity Reset," which is incorporated herein by reference in its entirety.

U.S. non-provisional application Ser. No. 16/055,568 claims priority under 35 U.S.C. § 120 to, and is a continuation of, U.S. non-provisional application Ser. No. 14/871,621 filed on Sep. 30, 2015, entitled "Activity Reset," and issued as U.S. Pat. No. 10,042,602 on Aug. 7, 2018, which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Digital music has become readily available due in part to the development of consumer level technology that has allowed people to listen to digital music on personal audio devices and via systems that include connected speakers. With the increased availability of digital music has come an increasing number of systems and devices that allow a person to listen to his or her chosen digital music, as well as an increasing number of preferences and settings that can be set by a user based on his or her specific preferences, to allow the user to have the best possible listening experience.

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
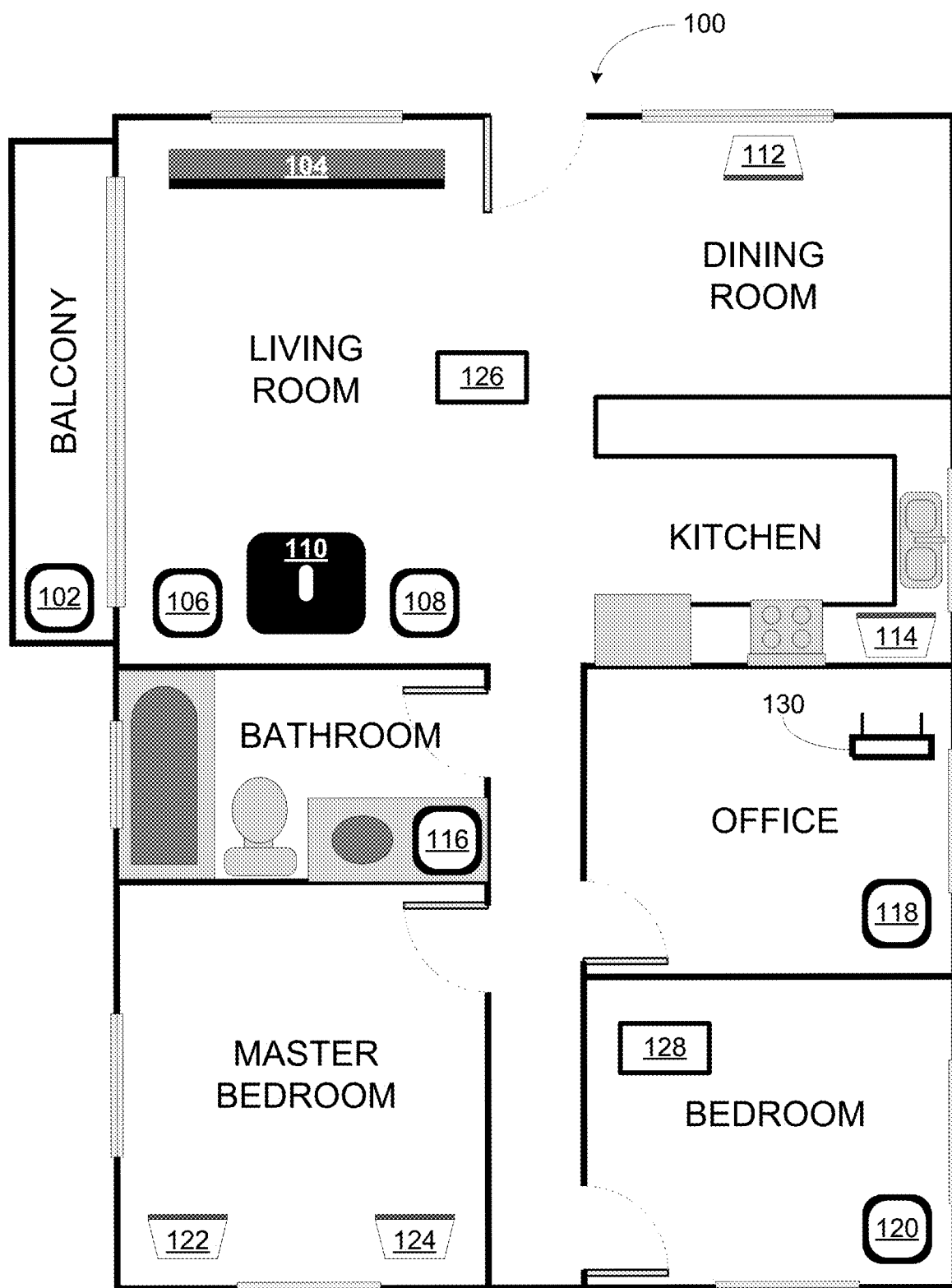
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Media playback systems have become increasingly popular as they are included in more and more homes, hotels, motels, stores, businesses and other like environments. Many of these environments encourage users of the system not only to play their own music, but also to customize the system to their liking by modifying the settings of the system based on their preferences.

In many environments that include a media playback system, a user of the system may only have access to the system for a short period of time. For instance, a hotel guest may have access to a media playback system included in a hotel room during his or her stay at the hotel. During the guest's stay, he or she may be encouraged to modify the settings of the media playback system to his or her taste, so that he or she has a positive experience during the stay. After the guest's stay, the next guest may check into the hotel, and may have different preferences for the media playback system. As another example, in a retail setting, a customer may experiment with the media playback system and, in doing so, modify the settings of the media playback system to suit his or her tastes. After the first customer tries out the media playback system, the next customer may then test the media playback system, and find that the media playback system reflects the preferences of the first customer. In some cases, the second guest or customer may have a negative association with the preferences of the first guest or customer. Because of the potential for a negative association, and in the interest of providing a uniform experience for all such users, a hotel, store, or other establishment may wish to reset the media playback system to a pre-defined state for each user.

Current techniques for resetting a media playback system may include performing a system reset or factory reset. These techniques, however, can require the entire system to reboot or re-initialize which may take some time. The techniques can also require a user to be physically present at the system to perform the reset, which may involve manually resetting each playback device in a system having multiple playback devices. Further, such techniques may leave the media playback system in an initial state, which may require that the media playback system undergo a set-up procedure to become fully operational again. For instance, such a set-up procedure might involve configuring playback devices to be part of the media playback system, and perhaps also to have particular roles in the system (e.g., to be members of a particular zone or zone group). As another example, set-up may also involve re-authenticating one or more accounts or media services associated with the system. Resetting a media playback system to a state where such a set-up procedure is required before using the system might not provide a desired experience for a customer, guest, or other user of a shared media playback system.

Thus, a need exists for a device and/or system that allows a media playback system to reset to a pre-defined state while remaining in a pre-defined state of media service. Example embodiments described herein involve a media playback system having a first playback device assigned to a first zone with a first zone name, a second playback device assigned to a second zone with a second zone name, and a queue that includes a particular set of media items, wherein the first and/or second playback devices are configured to play back from the queue. Example embodiments also include receiving a trigger indicating a request to reset the system, which may come from a variety of sources and in a variety of forms. The trigger may depend on the context in which the media playback system is located. For example, a trigger may occur when a hotel check in system indicates that a new guest is checking in to a given room. In another another example, a retail space with multiple sample household spaces, each having a media playback system therein, may include a reset box, button, or trigger. In response to receiving the trigger, the system may reset to the pre-defined state, while remaining in a state of media service in which music can be played, for example.

In one aspect, an example control system according to the present disclosure may include one or more processors, and a tangible non-transitory computer-readable memory having instructions stored thereon that, when executed by the one or more processors, cause the control system to perform a set of operations which includes (i) sending a message that arranges a media playback system into a pre-defined state in which a first zone of the media playback system includes a first playback device and is assigned a first zone name, a second zone of the media playback system includes a second playback device and is assigned a second zone name, and a queue includes a particular set of media items wherein at least one of the first zone and the second zone are configured to play back from the queue, and wherein each playback device is communicatively coupled to the control system, (ii) after sending the message, detecting a trigger indicating a request to reset the media playback system, and (iii) responsive to detecting the trigger, causing the media playback system to revert to the pre-defined state, wherein reverting the media playback system to the pre-defined state includes assigning the first zone name to the first zone and joining the first playback device to the first zone, assigning the second zone name to the second zone and joining the second playback device to the second zone, and configuring the queue with the particular set of media items, wherein at least one of the first zone and the second zone are configured to play back from the queue.

In another aspect, an example method may include (i) sending a message that arranges a media playback system into a pre-defined state, wherein the pre-defined state comprises a first zone of the media playback system that includes a first playback device and is assigned a first zone name, a second zone of the media playback system that includes a second playback device and is assigned a second zone name, and a queue that includes a particular set of media items, wherein at least one of the first zone and the second zone are configured to play back from the queue, (ii) after sending the message, detecting a trigger indicating a request to reset the media playback system, and (iii) responsive to detecting the trigger, causing the media playback system to revert to the pre-defined state, wherein reverting the media playback system to the pre-defined state comprises assigning the first zone name to the first zone and joining the first playback device to the first zone, assigning the second zone name to the second zone and joining the second playback device to the second zone, and configuring the queue with the particular set of media items, wherein at least one of the first zone and the second zone are configured to play back from the queue.

In yet another aspect, a non-transitory computer-readable memory is provided. The non-transitory computer-readable memory has stored thereon instructions executable by one or more processors that, when executed, cause the performance of a set of operations. The set of operations includes (i) sending a message that arranges a media playback system into a pre-defined state in which a first zone of the media playback system includes a first playback device and is assigned a first zone name, a second zone of the media playback system includes a second playback device and is assigned a second zone name, and a queue includes a particular set of media items wherein at least one of the first zone and second zone are configured to play back from the queue, (ii) after sending the message, detecting a trigger indicating a request to reset the media playback system, and (iii) responsive to detecting the trigger, causing the media playback system to revert to the pre-defined state, wherein reverting the media playback system to the pre-defined state comprises assigning the first zone name to the first zone and joining the first playback device to the first zone, assigning the second zone name to the second zone and joining the second playback device to the second zone, and configuring the queue with the particular set of media items, wherein at least one of the first zone and the second zone are configured to play back from the queue.

It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a hotel, motel, household, rental property, commercial setting like a restaurant, business, mall or airport, a vehicle like a sports utility vehicle (SUV), bus or car, a ship or boat, an airplane, and so on.

a. Example Playback Devices

Figure 2:
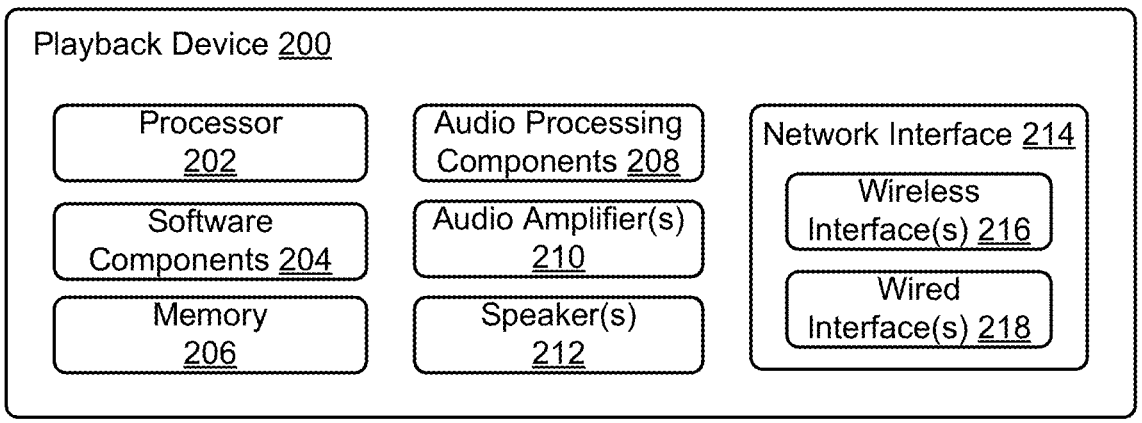
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions or operations. In one example, the functions or operations may involve the playback device 200 retrieving audio data from an audio source or another playback device. In another example, the functions may involve the playback device 200 sending audio data to another device or playback device on a network. In yet another example, the functions or operations may involve pairing of the playback device 200 with one or more playback devices to create a multi-channel audio environment.

Certain functions or operations may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200 such as, for example, all or part of a pre-determined state of a media playback system playback device 200 is a part of, one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
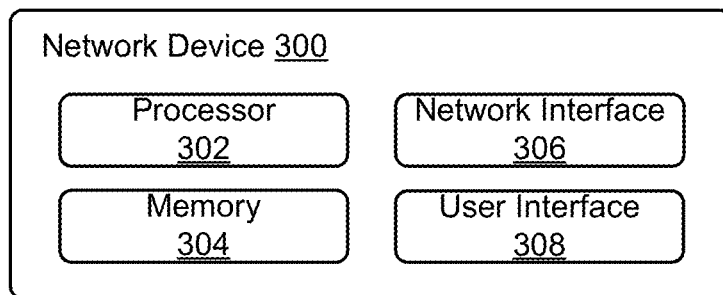
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions or operations relevant to facilitating user access, control, and configuration of the media playback system 100. The memory 304 may be configured to store instructions executable by the processor 302 to perform those functions or operations. The memory 304 may also be configured to store the media playback system controller application software and other data associated with the media playback system 100 and the user. In some examples, the memory 304 may be configured to store all or part of a pre-determined state of the media playback system control device 300 is a part of.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, or separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
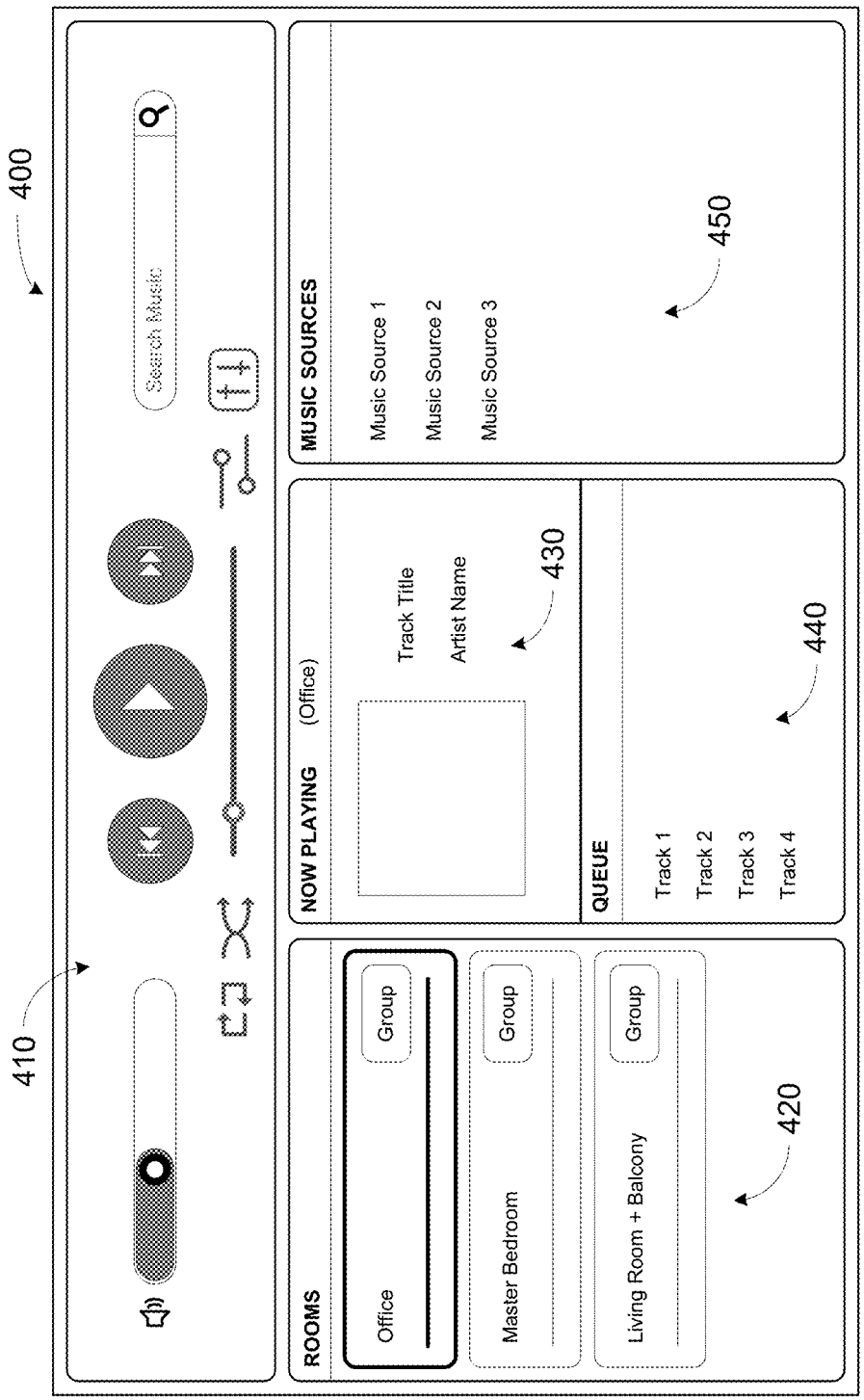
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Technique to Reset a Media Playback System to a Pre-Defined State

Figure 5:
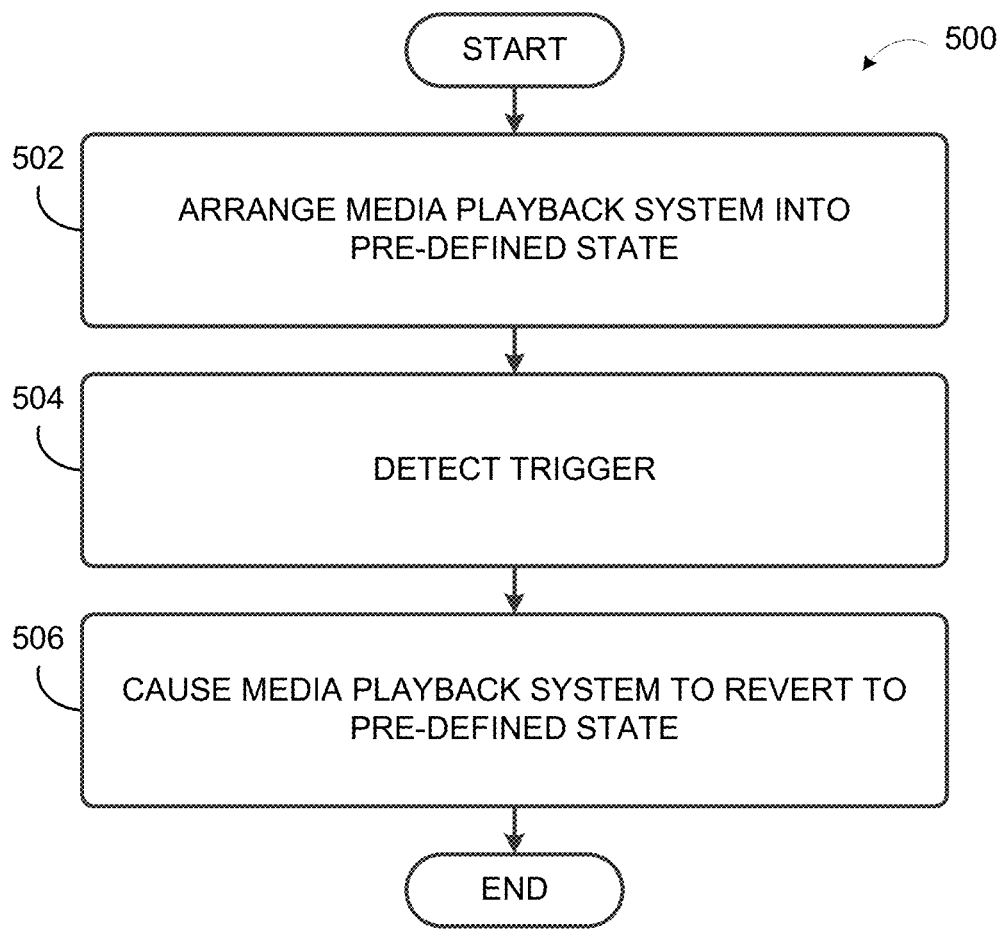
FIG. 5 shows an example flow diagram of an implementation of the present disclosure.

FIG. 5 shows a flow diagram of example implementation 500 for resetting a media playback system. Implementation 500 presents example techniques that can be implemented within an operating environment involving, for example, the media playback system 100 of FIG. 1, one or more of the playback device 200 of FIG. 2, and/or one or more of the control device 300. In one example, the implementation 500 may be performed in whole or in part by a control system in communication with a media playback system. Alternatively, the implementation 500 may be performed by one or more of the playback device 200 of FIG. 2, and/or one or more of the control device 300. In such cases, one or more of such systems and/or devices may have installed thereon a software application that includes instructions executable by one or more processors of a respective computing system to cause the respective device(s) or system to perform the functions of implementation 500.

Implementation 500 may include one or more operations, functions, or actions as illustrated by one or more of blocks 502-506. Although the respective blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the implementation 500 and other processes and methods disclosed herein, the flowcharts show functionality and operation of only a few possible implementations of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the implementation 500 and other processes and methods disclosed herein, each block may represent circuitry that is wired to perform the specific logical functions in the process.

a. Arrange Media Playback System into Pre-Defined State

At block 502, implementation 500 may include arranging a media playback system into a pre-defined state. For instance, a control system may send a message that arranges a media playback system into a pre-defined state in which a first zone of the media playback system includes a first playback device and is assigned a first zone name, a second zone of the media playback system includes a second playback device and is assigned a second zone name, and a queue includes a particular set of media items wherein at least one of the first zone and the second zone are configured to play back from the queue, and wherein each playback device is communicatively coupled to the control system.

In some examples, the message may be sent from a control device to one or more other control devices and/or playback devices of the media playback system. In other examples, the message may be sent from a playback device to one or more other playback devices and/or control devices of the media playback system. In still other examples, the message may be sent from a system or device connected to the media playback system, such as a server or cloud based system or device.

In some examples, the pre-defined state of the media playback system may include one or more playback devices and/or one or more control devices each having one or more settings or characteristics. The pre-defined state may include a specific combination of settings or characteristics of the playback and/or control devices. In some examples, the one or more settings or characteristics may include volume settings, equalization settings, room calibration settings, alarms, favorites, playlists, queues, a connection or pattern of connections between devices of the media playback system or other devices and systems, a zone, set of zones, zone group, and/or set of zone groups associated with one or more of the devices, one or more media services associated or registered with the one or more devices, one or more saved media items, one or more saved preferences, one or more accounts associated with one or more of the devices, information logging settings, or many other possible settings or characteristics.

In some examples, the pre-defined state of the media playback system may include one or more devices or systems such as one or more televisions, speakers, lighting devices, temperature devices, odor generating, masking, or removing devices, or any number of other devices or systems. Each of these devices or systems may have one or more settings.

As indicated above, in one example, a pre-defined state includes first and second playback devices. The first playback device is in a first zone, and the first zone is assigned a first name, while the second playback device is in a second zone and, and the second zone is assigned a second zone name. For instance, the first playback device may be in a first zone that corresponds to a kitchen of a house, and the first zone may be named "Kitchen," while the second playback device is in a zone that corresponds to a living room of the house, and the second zone may be named "Living Room." Continuing the example, the pre-defined state of the media playback system may include a queue, wherein the queue includes a particular set of media items. The queue may be stored on one or more of the playback devices, and/or by a server or cloud based system or device. The first and/or second playback devices may be configured to play back from the queue. For instance, the queue may include a set of media items corresponding to one or more songs, and the playback device of the Kitchen zone may be configured to play back the one or more songs.

In another example, the pre-defined state may arrange the first zone and the second zone into a zone group. The zone group may be configured to play back media from a shared queue in all zones of the zone group in synchrony. Other pre-defined states are possible as well.

In some examples, the pre-defined state of the media playback system may be determined at a given moment in time. For instance, a user may press a button or make a selection on a playback device or control device, or otherwise indicate a request to set a pre-defined state, and the pre-defined state may be determined based on the settings of the media playback system when the selection is made. In a particular example, a button may be pressed on a control interface of the control device, and the current settings of playback devices and control devices that are part of the media playback system may be stored as the pre-defined state.

In other examples, a user may select one or more settings of the media playback system via a user interface of a control device or playback device, and the pre-defined state may be determined based on the user-selected settings.

In still other examples, the pre-defined state may be determined automatically, or may be determined based on an input to the media playback system, such as an instruction received via a communication interface of the control device or playback device. The instruction may be transmitted from a device connected to the media playback system via a communication network such as a local area network over an Ethernet or WiFi connection.

In some examples, the pre-defined state may be stored in a memory of one or more devices. For instance, the pre-defined state may include particular settings for a plurality of playback devices that are part of a media playback system. The particular settings for each playback device may be stored respectively in a memory of each playback device itself. For example, a media playback system with two playback devices may store the particular settings of the first playback device in the memory of the first playback device, while storing the particular settings of the second playback device in the memory of the second playback device. As a result, storage of the settings of the predefined state may be distributed across both playback devices of the media playback system. In other examples, the pre-defined state may be stored by one device in the media playback system. In other examples, each device in the media playback system may store all or part of the pre-defined state. In still other examples, the pre-defined state may be stored by a device or system connected to the media playback system through one or more communication interfaces, such as storage on a server or cloud based system or device.

Figure 6:
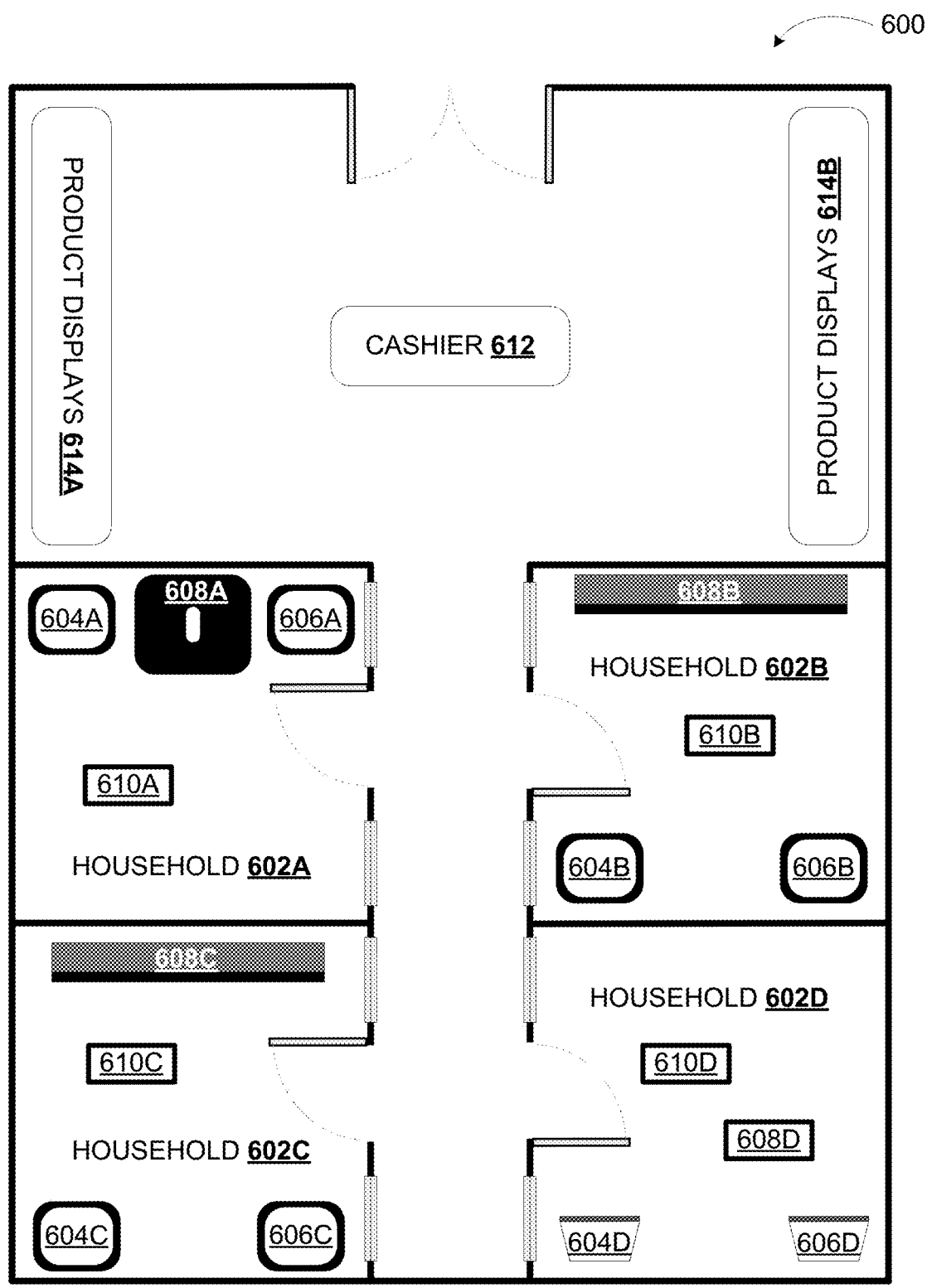
FIG. 6 shows an example retail space in which certain embodiments may be practiced.

As noted above, in some examples, one or more media playback systems may be utilized in a hotel, retail space, or other establishment. To illustrate, FIG. 6 depicts an example retail space 600 that includes a cashier 612, product displays 614A and 614B, and example households 602A, 602B, 602C, and 602D that include respective media playback systems. Each household may include one or more playback devices (e.g., one or more instances of playback device 200) and one or more control devices (e.g., one or more instances of control device 300).

A customer may enter one of the households to experience one of the media playback systems. In other words, each household is a demo space for a respective media playback system. Upon a customer leaving a household, a next customer entering a household, or another trigger, the media playback system of that household may be placed into a pre-defined state of media service, which does not reflect use or configuration of previous users.

As shown, household 602A includes playback devices 604A, 606A, and 608A, as well as control device 610A. In some cases, a pre-defined state may include playback devices 604A, 606A, and 608A as members of respective zones. Alternatively, two or more of playback devices 604A, 606A, and 608A may be configured as members of a zone (e.g., multiple playback devices in a "Living Room" zone). Further, the pre-defined state may include two or more of the zones being combined as a zone group (e.g., combining the "Living Room," "Kitchen," and "Den" zones into a "Party" zone group). As noted above, playback devices of a zone group are configured to play media in synchrony with one another. Control device 610A may be connected to playback devices 604A, 606A, and 608A so as to provide a control interface to control these playback devices.

Similarly, households 602B, 602C, and 602D include playback devices and a control device(s). In particular, household 602B includes playback devices 604B, 606B, and 608B, as well as control device 610B. Household 602C includes playback devices 604C, 606C, and 608C, as well as control device 610C. And, household 602D includes playback devices 604D and 606D, and also control devices 608D and 610D.

The respective media playback system of each of households 602A, 602B, 602C, and 602D may be configured with a particular set of media sources. Such a particular set of media sources may include streaming media services, music stored locally on the respective control devices, as well as other possible content sources as described above in connection with the example audio content sources.

Many streaming media services, such as SPOTIFY®, allow users to tailor their experience to their own preferences. For instance, such services may permit users of the services to create and store playlists. Upon receiving an opt-in, such services may also track a user's play history, so as to provide improved search or media content suggestions, among other benefits. Such tailoring may vary widely by user. As such, the pre-defined state may involve resetting such services to remove traces of previous users while also setting up some playlists or other media sources to get customers or guests experiencing music quickly. Further, the media playback systems may be configured to allow customers, guests, or other users to enter credentials associated with their respective accounts of such streaming media services so that the users can use their tailored experience with a given service with the demo media playback systems.

For example, a user may register a personal media service account with the media playback system, such as the user's personal SPOTIFY® account. The personal media service account may include preferences and functionality specific to the user. When the media service account is registered, the media playback system may modify a control interface based on the added media service account. For instance, a control interface, such as control interface 400 in FIG. 4, may add the registered media service account to audio content sources region 450, or to a "my music" interface.

When the user corresponding to the registered personal media service account is finished using the media playback system, the media playback system may be configured to remove the registered personal media service account from the media playback system, by removing the account from the control interface. As a result, a next user of the media playback system will not have access to the previous user's account, and/or will not be affected by the preferences associated with the previous user's account.

While an example retail space has been provided to illustrate example techniques, one having skill in the art will appreciate that such techniques may be applied to media playback systems in other establishments, such as lodging.

b. Detect Trigger

At block 504, implementation 500 may include detecting a trigger. For instance, after sending the message, a control system may detect a trigger indicating a request to reset the media playback system. In some examples, one or more playback devices and/or control devices of the media playback system may detect the trigger. The devices may detect the trigger via a communication interface or user interface, or via one or more connected input devices such as a touch sensor, optical sensor, pressure sensor, thermal sensor, motion sensor, or timing device, for example. Other inputs are possible as well.

In one example, the media playback system may be located in an environment, and detecting the trigger indicating the request to reset the media playback system may include detecting a change in the environment. For instance, the environment may be a room located in a store or other retail space (e.g., retail space 600), and the trigger may be that a customer has entered the room. In that case, the media playback system may detect that a customer has entered room by using one or more sensors, such as the motion sensor, and may determine that the person entering the room is the trigger.

Continuing the previous example, the media playback system may include a sensor that detects when a door has closed. The sensor may be a motion sensor, an optical sensor, a pressure sensor, or another type of sensor. When the door to the room is closed, the media playback system may be configured to determine that the door closing is a trigger, and responsively perform one or more actions or operations.

Figure 7A:
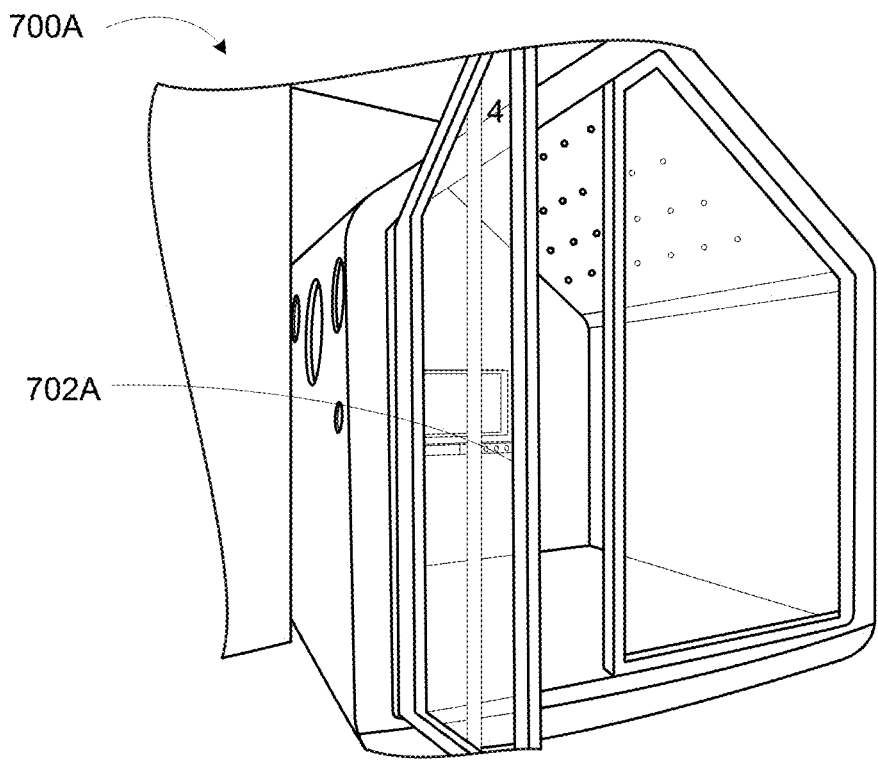
FIGS. 7A and 7B show an example implementation of a household in an example retail space, having an open and closed door respectively.
Figure 7B:
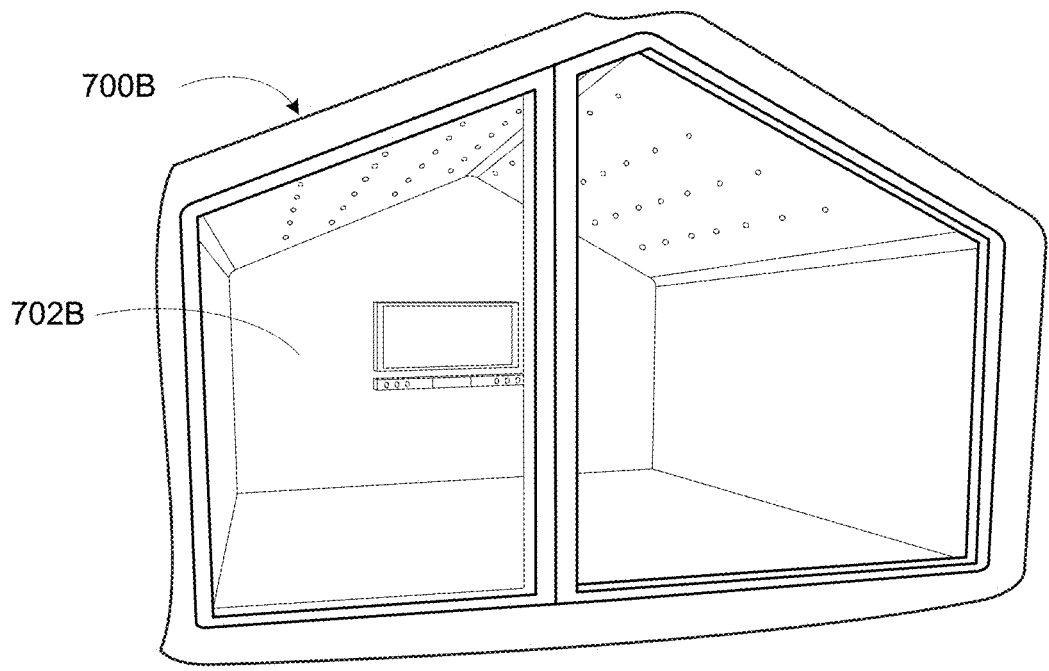

As an illustration, FIGS. 7A and 7B show an example household 700 with a door 702 in an example retail space. Household 700 may be one of a plurality of households present in a retail space. FIG. 7A shows household 700 in a state in which door 702 is open. FIG. 7B shows household 700 in a second state in which door 702 is closed. A media playback system may include one or more sensors that detect when door 702 is open or closed, and one or more actions or operation may be performed in response.

In another example, the trigger may include an indication that a period of inactivity of the media playback system has elapsed. For instance, a timing device or timer included as part of a playback device or control device may determine that 10 minutes has elapsed since the last activity of the media playback system has occurred. The period of inactivity can be as short as a few seconds, or as long as a few minutes, hours, or even days. A period of inactivity may be particularly useful as a trigger in a case where the media playback system is used by multiple users in a short span of time. For instance, it can be useful where the media playback system is located in a room used for the purpose of testing the system (e.g., one or more of the households of retail space 600), in which potential customers may enter, change the settings, and leave in a short period of time.

Another example trigger may include a voice sensor receiving data indicating a voice command to reset the media playback system. For instance, the media playback system may include a microphone that can receive one or more voice commands. The media playback system may be configured to receive the voice command via the microphone, and determine that a command indicates a request to reset the media playback system, such as the command "reset system," for example. Other commands are possible as well.

A further example trigger may include a reset button connected to a media playback system located in a household of a retail space. The reset button may be attached to the household, may be located at a central location in the retail space, or may be located somewhere else. A customer or employee working in the retail space may press the button in order to manually cause the media playback system to reset.

In another example, the media playback system may be in a location that has multiple guests staying for short periods of time, and the trigger may include an indication that a new guest is checking in. For instance, where the location is a hotel, motel, or other place having temporary lodging, the trigger may include an indication that a new guest has checked into a given room that includes the media playback system. The hotel may have, for example, a booking program on a computer system that is connected to a media playback system included in one or more rooms of the hotel. When a guest checks into the hotel, the booking system may send a message to the media playback system in the room associated with the guest, which may act as a reset trigger. Other triggers are possible as well.

c. Cause Media Playback System to Revert to Pre-Defined State

At block 506, implementation 500 may include causing the media playback system to revert to the pre-defined state. For instance, responsive to detecting the trigger, the control system may cause the media playback system to revert to the pre-defined state. Continuing the example above, reverting the media playback system to the pre-defined state may involve assigning the first zone name to the first zone and joining the first playback device to the first zone, assigning the second zone name to the second zone and joining the second playback device to the second zone, and configuring the queue with the particular set of media items, such that at least one of the first zone and the second zone are configured to play back from the queue. As another example, a control system may revert one or more of households 602A, 602B, 602C, and/or 602D to the pre-defined state, perhaps to serve a new customer.

In some examples, reverting the media playback system to the pre-defined state may include changing the volume settings, equalization settings, room calibration settings, alarms, favorites, playlists, queues, a connection or pattern of connections between devices of the media playback system or other devices and systems, a zone, set of zones, zone group, and/or set of zone groups associated with one or more of the devices, one or more media services associated or registered with the one or more devices, one or more saved media items, one or more saved preferences, an account associated with one or more of the devices, logging information settings, or many other possible settings or characteristics of one or more playback devices or control devices of the media playback system.

In addition, reverting the media playback system may include changing the settings of one or more other devices or systems such as the one or more televisions, speakers, lighting devices, temperature devices, odor generating, masking, or removing devices, or any number of other devices or systems. This may include displaying one or more images or videos on the television, or changing a temperature setting, lighting setting, or odor, for example.

In one example, reverting the media playback system to the pre-defined state may include transmitting a message that causes one or more settings or characteristics to change. The message may be transmitted by one or more control devices to one or more playback devices, which may, responsive to receiving the message, revert to the pre-defined state. In other examples, the message may be sent to one or more media services associated with the media playback system, such as SPOTIFY®, which may cause the one or more media services to reset an account to an initial state.

In another example, reverting the media playback system to the pre-defined state may include joining the first zone and the second zone into a zone group. One or more playback devices may be included in the first zone and/or the second zone, and responsive to receiving a trigger, the media playback system may join the first zone and the second zone to create a zone group. As a particular example, a media playback system may be used in a household an under normal circumstances, may include three zones named "Kitchen," "Living Room," and "Patio." Upon detecting a trigger, the media playback system may revert to a pre-defined state in which the three zones are joined together in a zone group named "Party," which allows all playback devices in the three zones to play in synchrony.

In some examples, reverting the media playback system may include configuring a shared queue of a zone group with a particular set of media items. For instance, in the previous example, in addition to joining the three zones together into the "Party" zone group, the media playback system may, responsive to detecting the trigger, populate a shared queue of the zone group with a set of media items. In some examples the set of media items may be an empty set, such that responsive to detecting the trigger the media playback system clears the queue. In other examples, the set of media items may include a set of pre-selected media items chosen from a list or database.

In some examples, reverting the media playback system to the pre-defined state may include sending a message that resets the first zone and the second zone to respective pre-defined volume levels such that the first playback device and the second playback device are configured to play back media at the respective pre-defined volume levels.

In other examples, reverting the media playback system to the pre-defined state may include sending a message that resets the first zone and the second zone to respective pre-defined equalizations such that the first playback device and the second playback device are configured to playback media with the respective pre-defined equalizations.

In still further examples, the first playback device and the second playback device may be positioned in respective locations in an environment, and reverting the media playback system to the pre-defined state may include applying respective calibrations that correspond to the respective locations of the first playback device and the second playback device in the environment. For instance, some example calibration procedures may calibrate a playback device for a particular position within a listening area so as to offset the acoustics of the environment during operation. As part of reverting the pre-defined state, the control system may revert to this calibration, which may have been changed by a user experimenting with the system.

In addition, for the implementation 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

IV. Conclusion

The descriptions above disclose, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves resetting a media playback system to a pre-defined state. In one aspect, a control system is provided. The control system includes one or more processors and a tangible non-transitory computer-readable memory having instructions stored thereon that, when executed by the one or more processors, cause the control system to perform a set of operations. The set of operations may include sending a message that arranges a media playback system into a pre-defined state. The predefined state may include a first playback device in a first zone having a first zone name, a second playback device in a second zone having a second zone name, and a queue having a particular set of media items. The set of operations may also include, after sending the message, detecting a trigger indicating a request to reset the media playback system. The set of operations may further include, responsive to detecting the trigger, causing the media playback system to revert to the pre-defined state. Reverting to the pre-defined state may include assigning the first zone name to the first zone and joining the first playback device to the first zone, assigning the second zone name to the second zone and joining the second playback device to the second zone, and configuring the queue with the particular set of media items.

In another aspect, a method is provided. The method may involve sending a message that arranges a media playback system into a pre-defined state. The predefined state may include a first playback device in a first zone having a first zone name, a second playback device in a second zone having a second zone name, and a queue having a particular set of media items. The method may also involve, after sending the message, detecting a trigger indicating a request to reset the media playback system. The method may further involve, responsive to detecting the trigger, causing the media playback system to revert to the pre-defined state. Reverting to the pre-defined state may include assigning the first zone name to the first zone and joining the first playback device to the first zone, assigning the second zone name to the second zone and joining the second playback device to the second zone, and configuring the queue with the particular set of media items.

In yet another aspect, a non-transitory computer readable memory is provided. The non-transitory computer readable memory has stored thereon instructions executable by a computing device to cause the computing device to perform functions. The functions may include sending a message that arranges a media playback system into a pre-defined state. The predefined state may include a first playback device in a first zone having a first zone name, a second playback device in a second zone having a second zone name, and a queue having a particular set of media items. The functions may also include, after sending the message, detecting a trigger indicating a request to reset the media playback system. The functions may further include, responsive to detecting the trigger, causing the media playback system to revert to the pre-defined state. Reverting to the pre-defined state may include assigning the first zone name to the first zone and joining the first playback device to the first zone, assigning the second zone name to the second zone and joining the second playback.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A control system for controlling a plurality of media playback systems in respective listening rooms within a retail store, each media playback system comprising at least one respective playback device connected to a respective wireless local area network and a first media playback system in a first listening room comprising a first playback device connected to a first wireless local area network, the control system comprising:
   one or more processors; and
   data storage storing instructions that, when executed by the one or more processors, cause the control system to perform functions comprising:
      sending, via a network interface of the control system to the first playback device, a message that configures the first media playback system to operate in a pre-defined first state in which: (a) a first zone of the first media playback system includes the first playback device and is assigned a first zone name, and (b) a queue includes a first set of one or more media items, wherein the first zone is configured to play back media items from the queue;
      operating the first media playback system in a second state, wherein operating the first media playback system in the second state comprises: (i) populating the queue with a second set of one or more media items, wherein the second set of one or more media items includes one or more media items that are different from the first set of one or more media items, (ii) causing the first zone to play back at least one media item of the second set of one or more media items and (iii) receiving input indicating a command to adjust a volume setting of the first playback device to a given volume level;
      after operating the first media playback system in the second state, receiving, via the network interface from a trigger source external to the first media playback system, data indicating that a new customer is entering into the first listening room that contains the first media playback system, wherein the data is a trigger that causes the first media playback system to revert to the pre-defined first state; and
      responsive to receiving the data indicating that the new customer is entering into the first listening room, causing the first media playback system to revert to the pre-defined first state, wherein reverting the first media playback system to the pre-defined first state comprises responsive to the trigger: (a) populating the queue with only the first set of one or more media items and (b) sending an instruction that resets the first zone to a pre-defined volume level such that the first playback device is configured to play back media at the pre-defined volume level of the pre-defined first state.

2. The control system of claim 1, wherein operating the first media playback system in the second state further comprises receiving, via a customer mobile device, input indicative of credentials associated with a first account of a streaming media service, and wherein reverting the first media playback system to the pre-defined first state further comprises responsive to the trigger, resetting the streaming media service, wherein resetting the streaming media service comprises removing the first account of the streaming media service from the first media playback system.

3. The control system of claim 1, wherein operating the first media playback system in the second state further comprises receiving input indicating a command to modify equalization of the first playback device, and wherein reverting the first media playback system to the pre-defined first state further comprises responsive to the trigger, sending an instruction that resets the first zone to a pre-defined equalization of the pre-defined first state.

4. The control system of claim 1, wherein receiving the data indicating that the new customer is entering into the first listening room that contains the first media playback system comprises receiving data indicating that a door to the first listening room has opened and closed.

5. The control system of claim 1, wherein receiving the data indicating that the new customer is entering into the first listening room that contains the first media playback system comprises receiving data indicating that one or more new mobile devices were detected in the first listening room.

6. The control system of claim 1, wherein a bonded zone of the first media playback system includes the first playback device and a second playback devices configured to play back respective channels of multi-channel audio content, wherein operating the first media playback system in the second state further comprises receiving input indicating a command to remove the first playback device from the bonded zone, and wherein reverting the first media playback system to the pre-defined first state further comprises responsive to the trigger, sending an instruction that forms the bonded zone with the first playback device and the second playback device.

7. A method of controlling a plurality of media playback systems in respective listening rooms within a retail store, each media playback system comprising at least one respective playback device connected to a respective wireless local area network and a first media playback system in a first listening room comprising a first playback device connected to a first wireless local area network, the method comprising:
   sending, via a network interface to the first playback device, a message that configures the first media playback system to operate in a pre-defined first state in which: (a) a first zone of the first media playback system includes the first playback device and is assigned a first zone name, and (b) a queue includes a first set of one or more media items, wherein the first zone is configured to play back media items from the queue;
   operating the first media playback system in a second state, wherein operating the first media playback system in the second state comprises: (i) populating the queue with a second set of one or more media items, wherein the second set of one or more media items includes one or more media items that are different from the first set of one or more media items, (ii) causing the first zone to play back at least one media item of the second set of one or more media items and (iii) receiving input indicating a command to adjust a volume setting of the first playback device to a given volume level;
   after operating the first media playback system in the second state, receiving, via the network interface from a trigger source external to the first media playback system, data indicating that a new customer is entering into the first listening room that contains the first media playback system, wherein the data is a trigger that causes the first media playback system to revert to the pre-defined first state; and
   responsive to receiving the data indicating that the new customer is entering into the first listening room, causing the first media playback system to revert to the pre-defined first state, wherein reverting the first media playback system to the pre-defined first state comprises responsive to the trigger: (a) populating the queue with only the first set of one or more media items and (b) sending an instruction that resets the first zone to a pre-defined volume level such that the first playback device is configured to play back media at the pre-defined volume level of the pre-defined first state.

8. The method of claim 7, wherein operating the first media playback system in the second state further comprises receiving, via a customer mobile device, input indicative of credentials associated with a first account of a streaming media service, and wherein reverting the first media playback system to the pre-defined first state further comprises responsive to the trigger, resetting the streaming media service, wherein resetting the streaming media service comprises removing the first account of the streaming media service from the first media playback system.

9. The method of claim 7, wherein operating the first media playback system in the second state further comprises receiving input indicating a command to modify equalization of the first playback device, and wherein reverting the first media playback system to the pre-defined first state further comprises responsive to the trigger, sending an instruction that resets the first zone to a pre-defined equalization of the pre-defined first state.

10. The method of claim 7, wherein receiving the data indicating that the new customer is entering into the first listening room that contains the first media playback system comprises receiving data indicating that a door to the first listening room has opened and closed.

11. The method of claim 7, wherein receiving the data indicating that the new customer is entering into the first listening room that contains the first media playback system comprises receiving data indicating that one or more new mobile devices were detected in the first listening room.

12. The method of claim 7, wherein a bonded zone of the first media playback system includes the first playback device and a second playback devices configured to play back respective channels of multi-channel audio content, wherein operating the first media playback system in the second state further comprises receiving input indicating a command to remove the first playback device from the bonded zone, and wherein reverting the first media playback system to the pre-defined first state further comprises responsive to the trigger, sending an instruction that forms the bonded zone with the first playback device and the second playback device.

13. A system comprising:
a plurality of media playback systems in respective listening rooms within a retail store, each media playback system comprising at least one respective playback device connected to a respective wireless local area network and a first media playback system in a first listening room comprising a first playback device connected to a first wireless local area network; and
a control system configured to perform functions comprising:
sending, via a network interface of the control system to the first playback device, a message that configures the first media playback system to operate in a pre-defined first state in which: (a) a first zone of the first media playback system includes the first playback device and is assigned a first zone name, and (b) a queue includes a first set of one or more media items, wherein the first zone is configured to play back media items from the queue;
operating the first media playback system in a second state, wherein operating the first media playback system in the second state comprises: (i) populating the queue with a second set of one or more media items, wherein the second set of one or more media items includes one or more media items that are different from the first set of one or more media items, (ii) causing the first zone to play back at least one media item of the second set of one or more media items and (iii) receiving input indicating a command to adjust a volume setting of the first playback device to a given volume level;
after operating the first media playback system in the second state, receiving, via the network interface from a trigger source external to the first media playback system, data indicating that a new customer is entering into the first listening room that contains the first media playback system, wherein the data is a trigger that causes the first media playback system to revert to the pre-defined first state; and
responsive to receiving the data indicating that the new customer is entering into the first listening room, causing the first media playback system to revert to the pre-defined first state, wherein reverting the first media playback system to the pre-defined first state comprises responsive to the trigger: (a) populating the queue with only the first set of one or more media items and (b) sending an instruction that resets the first zone to a pre-defined volume level such that the first playback device is configured to play back media at the pre-defined volume level of the pre-defined first state.

14. The system of claim 13, wherein operating the first media playback system in the second state further comprises receiving, via a customer mobile device, input indicative of credentials associated with a first account of a streaming media service, and wherein reverting the first media playback system to the pre-defined first state further comprises responsive to the trigger, resetting the streaming media service, wherein resetting the streaming media service comprises removing the first account of the streaming media service from the first media playback system.

15. The system of claim 13, wherein operating the first media playback system in the second state further comprises receiving input indicating a command to modify equalization of the first playback device, and wherein reverting the first media playback system to the pre-defined first state further comprises responsive to the trigger, sending an instruction that resets the first zone to a pre-defined equalization of the pre-defined first state.

16. The system of claim 13, wherein receiving the data indicating that the new customer is entering into the first listening room that contains the first media playback system comprises receiving data indicating that a door to the first listening room has opened and closed.

17. The system of claim 13, wherein receiving the data indicating that the new customer is entering into the first listening room that contains the first media playback system comprises receiving data indicating that one or more new mobile devices were detected in the first listening room.

* * * * *